United States Patent [19]
You

[11] Patent Number: 5,744,783
[45] Date of Patent: Apr. 28, 1998

[54] AUTOMATIC TEMPERATURE CONTROLLING METHOD IN ELECTRIC RICE COOKER

[75] Inventor: Sang-Uk You, Kyeongki-Do, Rep. of Korea

[73] Assignee: Daewoo Electronics, Ltd., Seoul, Rep. of Korea

[21] Appl. No.: 755,312

[22] Filed: Nov. 22, 1996

[30] Foreign Application Priority Data

| Nov. 24, 1995 | [KR] | Rep. of Korea | 1995-43438 |
| Nov. 24, 1995 | [KR] | Rep. of Korea | 1995-43439 |
| Nov. 30, 1995 | [KR] | Rep. of Korea | 1995-45136 |

[51] Int. Cl.$^6$ ............................................. H05B 1/02
[52] U.S. Cl. ............ 219/497; 219/492; 219/710; 99/330; 99/325; 99/328
[58] Field of Search ............... 219/492, 497, 219/505, 508, 486, 702, 710, 719; 99/325, 326, 327, 328, 330

[56] References Cited

U.S. PATENT DOCUMENTS

| 4,488,026 | 12/1984 | Tanabe | 219/10.55 B |
| 4,585,925 | 4/1986 | Andre | 219/497 |
| 4,674,890 | 6/1987 | Kojima et al. | 368/107 |
| 4,695,710 | 9/1987 | Yamashita et al. | 219/506 |
| 5,111,026 | 5/1992 | Ma | 219/492 |
| 5,183,984 | 2/1993 | Nakagawa | 99/325 |
| 5,283,410 | 2/1994 | Kim | 219/700 |

*Primary Examiner*—Mark H. Paschall

[57] ABSTRACT

Disclosed is an automatic temperature controlling method of an electric rice cooker capable of approximately cooking rice at a set temperature. A reference temperature of an internal pot is pre-set according to a time passage so that the rice can approximately be cooked at the set temperature by controlling the heater operation period. Therefore, a change in the state a boiled rice due to an outside influence may be prevented.

10 Claims, 7 Drawing Sheets

AUTOMATIC TEMPERATURE CONTROLLING METHOD IN ELECTRIC RICE COOKER

BACKGROUND OF THE INVENTION

1. Field of the Invention

The present invention relates to an automatic temperature controlling method in an electric rice cooker. More particularly, the present invention relates to an automatic temperature controlling method in an electric rice cooker which is capable of cooking rice at an approximately set temperature.

2. Description of the Prior Art

The operation of a cooking process of the general electric rice cooker will be described with reference to FIG. 1, which is a graph for illustrating a general rice cooking process of an electric rice cooker.

At first, when an internal pot is placed in the electric rice cooker, a key senses the placement of the internal pot. When a user pushes a menu key and pushes a key for starting a rice cooking, a progressive program is performed. The electric rice cooker then progress through a number of processes. That is, a process for cooking a rice is performed in the order of an absorbing (soaking) process, a heating process, a heat preserving process, and a steaming process. The absorbing process is completed by heating a heater included in the electric rice cooker for ten minutes so that a temperature of the internal pot, that is, that of a rice, is increased from 25° C. to 45° C., and thus soaking the rice at a temperature of 45° C. The heating process includes a first heating process and a second heating process. After the absorbing process is finished, the first heating process is performed by heating the heater for four minutes so that the temperature of the rice is increased from 45° C. to 75° C. Then, the second heating process is performed by heating the heater for two minutes so that the temperature of the cooking rice is increased from 75° C. to 102° C. Then, the heat-preserving process is carried out by heating the heater for three minutes so that the temperature of the cooking rice can be increased from 102° C. to 125° C. Then, the steaming process is completed by keeping the cooking rice at 125° C. for ten minutes. When the process for cooking the rice is finished, a display indicates that the rice has been completely cooked. The user can confirm that the cooking process is advancing through the different processes after the internal pot is placed in the electric rice cooker.

However, since a conventional heating method of an electric rice cooker for cooking a rice is performed while determining a set heater operation period and a heat amount on the basis of a rice cooking amount, it has a problem that a rice state changes according to outside circumstances.

In other words, a change in condition such as a voltage drop, an outside temperature change, or a rice cooking at a high temperature affects a rice cooking duration. It causes a heater period and a heat amount to be selected inappropriately to heat the electric rice cooker so that a rice state is changed, by giving rise to an incorrect rice cooking amount judgement.

U.S. Pat. No. 5,111,026 (issued to Chun-Ho Ma on May 5, 1992) discloses one example of an automatic temperature controlling method of an electric rice cooker. An objective of U.S. Pat. No. 5,111,026 is provide a control method for an electric rice cooker which controls the soaking time, controls the steaming time of the boiled rice, and which functions exactly at predetermined temperatures.

The conventional method includes a first switching step for switching "on" and "off" repeatedly an AC power supplied to a first heating device, so that a temperature of an inner pot of the rice cooker is increased in a slow slope; a first disconnecting step for disconnecting the AC power from the first heating device during a first predetermined interval required for the temperature of the inner pot to decrease from a first predetermined temperature to a second predetermined temperature; a second switching step for switching "on" and "off" repeatedly the AC power of the first heating device so as to maintain a constant temperature of the inner pot during a second predetermined interval; a connecting step for connecting the AC power to the first heating device without an interval so as to increase the temperature of the inner pot to a third predetermined temperature: a second disconnecting step for disconnecting the AC power from the first heating device during a third predetermined interval; a third switching step for switching "on" and "off" the AC power alternately connected with the first heating device and a second heating device; and a controlling step for controlling the AC power connected to the second heating device so as to maintain the temperature of the inner pot at a fourth predetermined temperature. According to the teaching of U.S. Pat. No. 5,111,026, the soaking time, the steaming time of the boiled rice may be controlled, and the soaking and the steaming may be performed at the precise predetermined temperatures. However, according to the method of U.S. Pat. No. 5,111,026, the rice can not be cooked at the precise set temperature.

SUMMARY OF THE INVENTION

Therefore, an object of the present invention is to provide an automatic temperature controlling method of an electric rice cooker capable of cooking rice at approximately set temperature.

In order to achieve the above-mentioned object of the present invention, there is provided an automatic temperature controlling method of an electric rice cooker, said method comprising the steps of:

a) storing reference temperature data of an internal pot according to a time passage, and storing heater operation state data and heater on/off operation period data according to a temperature change of the internal pot during a second heating process and a heat-preserving process;

b) heating the internal pot to a temperature for completing, a first heating process after a soaking process, calculating a time for judging a rice cooking amount from a temperature for beginning the first heating process to the temperature for completing a first heating process, storing the calculated time for judging the amount rice cooking amount, and storing a rice cooking amount corresponding to the calculated time;

c) starting a second heating process and judging how many rice cooking amount is the rice cooking mount stored in step b);

d) reading a heater operation period data corresponding to the judged rice cooking amount from the stored heater operation period data in step a), and determining a heater on/off operation period of the second heating process based on the read heater operation period data;

e) judging whether a current temperature of the internal pot is equal to or greater than a temperature for starting a heat-preserving process, and when the current temperature of the internal pot is less than the temperature for starting a heat-preserving process, comparing the current temperature of the internal pot with the reference temperature data stored in step a);

f) controlling an operation of the heater according to a comparison result of step e);

g) starting the heat-preserving process and judging which rice cooking amount is the rice cooking amount stored in step b), when the current temperature of the internal pot is equal to or greater than the temperature for starting the heat-preserving process in step e);

h) reading a heater operation period data corresponding to the judged rice cooking amount from the stored heater operation period data in step a), and determining the heater operation period of the heat-preserving process based on the read heater operation period data;

i) judging whether a current temperature of the internal pot is equal to or greater than a temperature for starting a steaming process, and when the current temperature of the internal pot is less than the temperature for starting a steaming process, comparing the current temperature of the internal pot with the reference temperature data stored in step a); and j) controlling an operation of the heater according to a comparison result of step j).

Preferably, according to a comparison result of step e), the heater stops when the current temperature of the internal pot is less than the reference temperature data stored in step a), and the internal pot is heated with the determined heater operation period in step d) when the current temperature of the internal pot is equal to or greater than the reference temperature data stored in step a). More preferably, according to a comparison result of step i), the heater stops when the current temperature of the internal pot is less than the reference temperature data stored in step a), and the internal pot is heated with the determined heater operation period in step h) when the current temperature of the internal pot is equal to or greater than the reference temperature data stored in step a).

According to the present invention, a reference temperature of an internal pot is pre-set according to a time passage so that the rice can be cooked at the approximately set temperature by controlling the heater operation period. Therefore, the present invention has an advantages that it can prevent a change in the state a boiled rice due to an outside influence.

BRIEF DESCRIPTION OF THE DRAWINGS

The above objects and advantages of the present invention will become more apparent by describing in detail a preferred embodiment thereof with reference to the attached drawings, in which.

DESCRIPTION OF THE PREFERRED EMBODIMENT

A description will be given below in detail, with reference to the accompanying drawings, of the mechanical structure, the circuitry configuration, and the operation of a method and an apparatus for uniformly cooking a rice according to one embodiment of the present invention.

Figure 1:
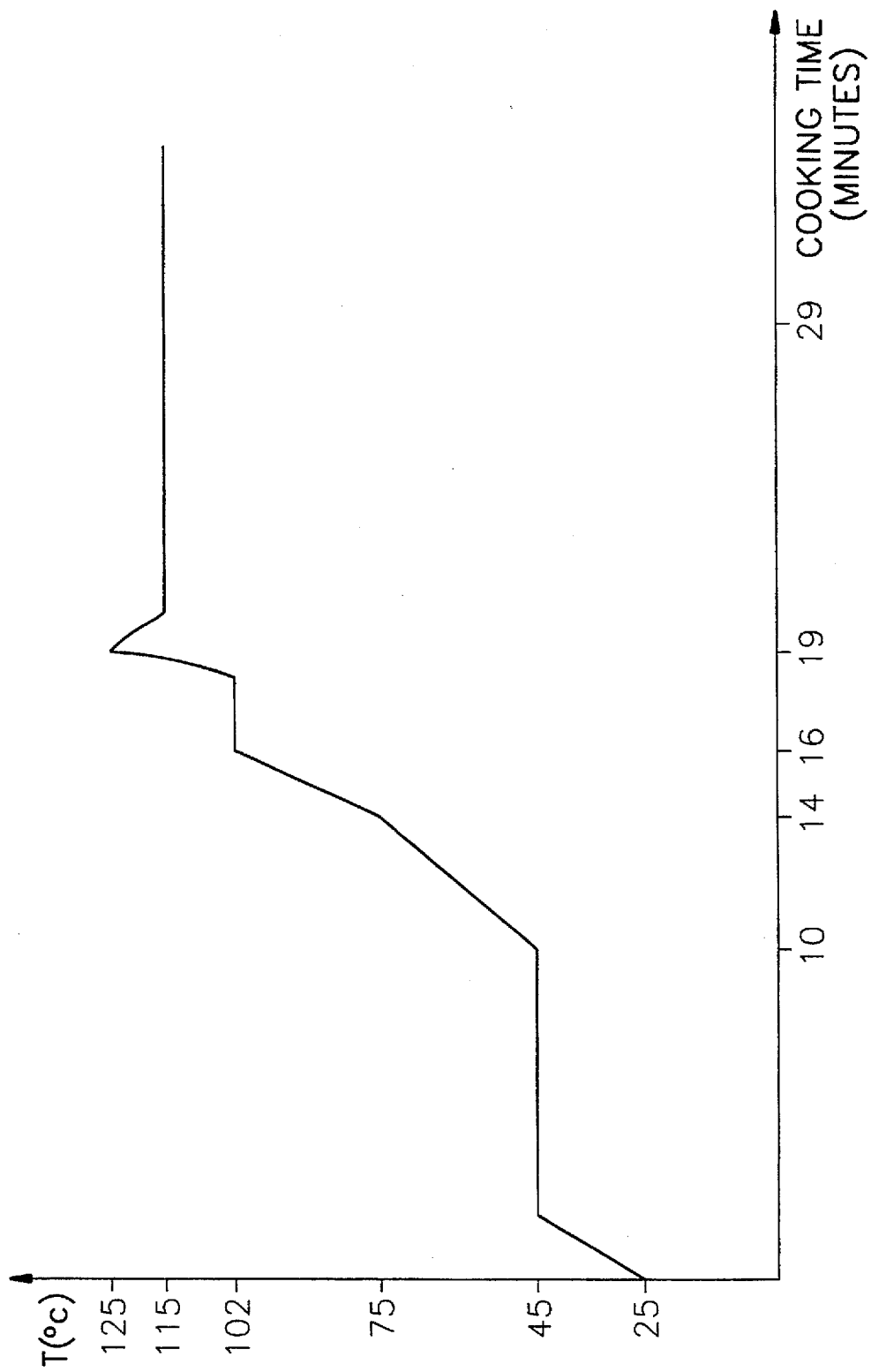
FIG. 1 is a graph for illustrating a conventional rice cooking process of an electric rice cooker.
Figure 2:
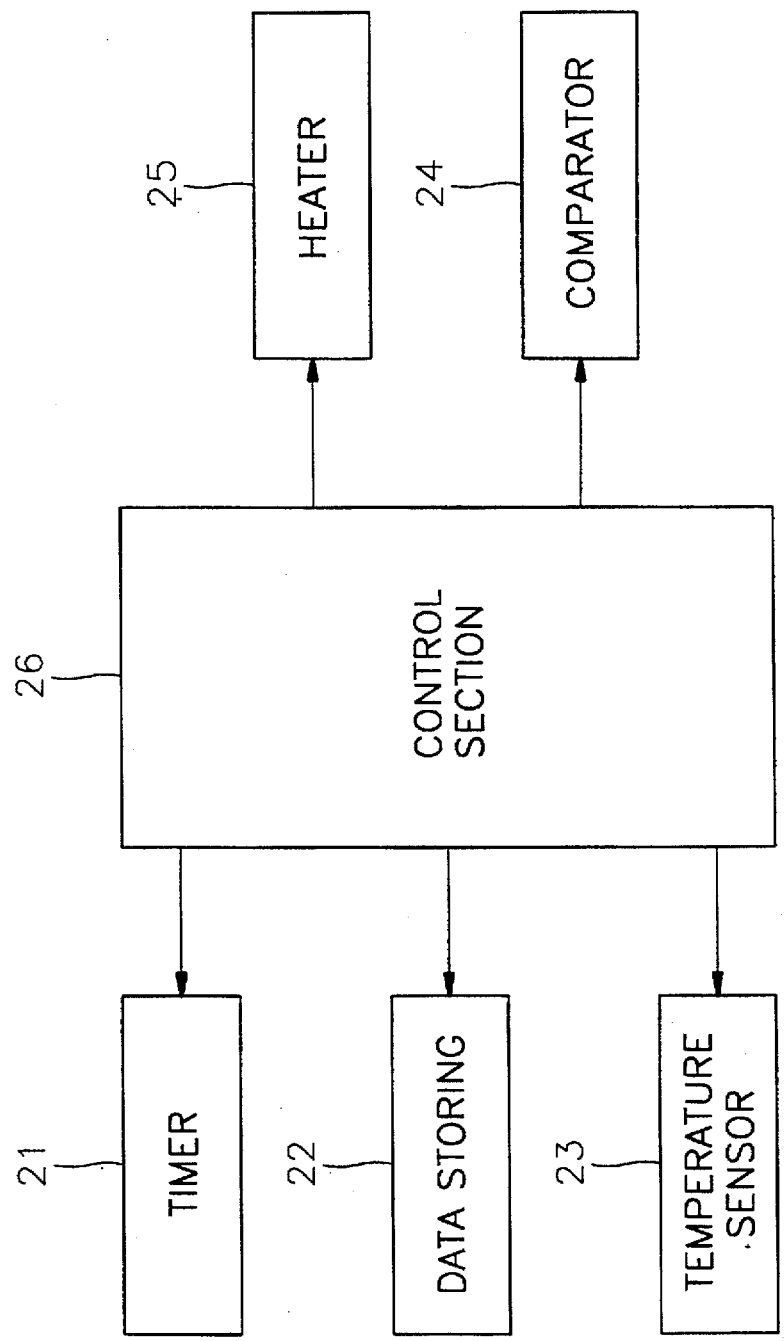
FIG. 2 is a block diagram for showing a circuitry configuration of an electric rice cooker which can perform the present invention.

FIG. 2 shows the configuration of an electric rice cooker 2 which can perform the present invention. Electric rice cooker 2 includes a timer 21, a data storing section 22, a temperature sensor 23, a temperature comparator 24, a heater 25, and a control section 26.

Timer 21 provides a set time for measuring a current temperature for control section 26. Data storing section 22 stores reference temperature data of an internal pot according to a time passage, and stores heater operation state and a heater operation period according to the temperature change of the internal pot during a second heating process and a heat-preserving process therein. A temperature sensor 23 senses a current temperature of the internal pot and provides data thereof to control section 26. A temperature comparator 24 compares the current temperature of the internal pot sensed by temperature sensor 23 with the stored reference temperature data in data storing section 22. A heater 25 includes rice cooking and steaming heaters (not shown), which turns on and turns off depending on a control output of control section 26 according to the condition of each process so that a heating operation can be performed for cooking a rice. Control section controls the operations of timer 21, data storing section 22, temperature sensor 23, temperature comparator 24, and heater 25, and judges whether or not the current temperature of the internal pot sensed by temperature sensor 23 is equal to or greater than the stored reference temperature data in the data storing section 22.

Figure 3:
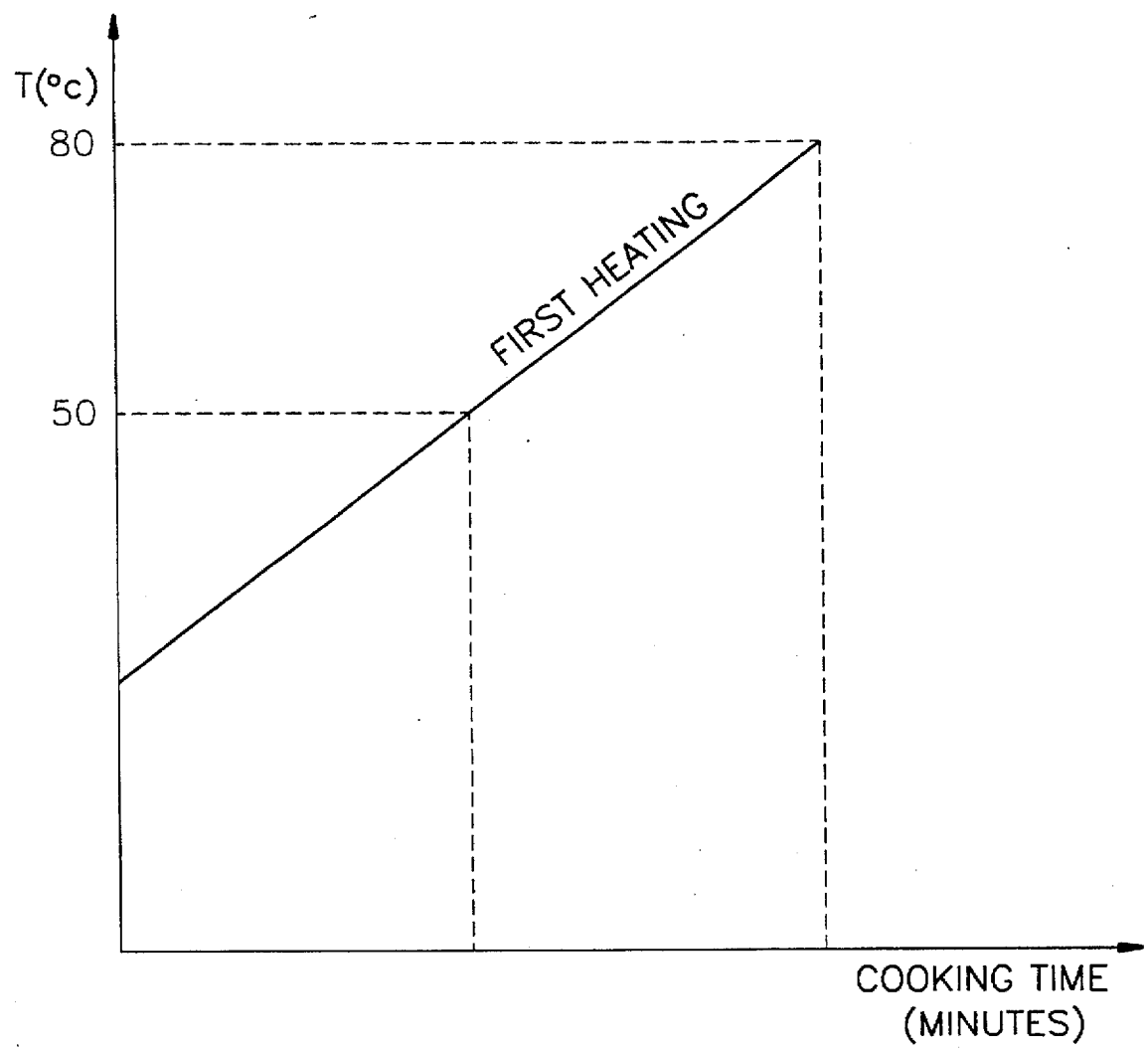
FIG. 3 is a schematic view for showing a judgement of a rice cooking duration according to one embodiment of the present invention.

FIG. 3 shows a judgement of a rice cooking duration according to one embodiment of the present invention. The rice cooking duration is judged by a required time for heating an internal pot temperature T from 50° C. to 80° C. during a first heating process. Table 1 illustrates a standard for the judgement of a rice cooking amount illustrated in FIG. 3. As described in Table 1, zero to two minutes and fifty-nine seconds is required to cook a rice of a first amount (1–2 persons amount), three minutes to four minutes and fifty-nine seconds is required to cook a rice of a second amount (3–4 persons amount), five minutes to six minutes and fifty-nine seconds is required to cook a rice of a third amount (5–6 persons amount), seven minutes to eight minutes and fifty-nine seconds is required to cook a rice of a fourth amount (7–8 persons amount), and more than nine minutes is required to cook a rice of a fifth amount (9–10 persons amount).

TABLE 1

| RICE COOKING AMOUNT | 1 | 2 | 3 | 4 | 5 |
|---|---|---|---|---|---|
| REQUIRED TIME | 0 min–2 min 59 sec | 3 min–4 min 59 sec | 5 min–6 min 59 sec | 7 min–8 min 59 sec | more than 9 min |

Table 2 describes a heater operation period corresponding with a rice cooking amount according to one embodiment of the present invention. As illustrated in Table 2, an on/off operation period of heater 25 during a second heating process for the first amount (1–2 persons amount), the second amount (3–4 persons amount), the third amount (5–6 persons amount), the fourth amount (7–8 persons amount), and the fifth amount (9–10 persons amount) are 6 seconds/4 seconds. 7/3, 8/2, 9/1, and 10/0, respectively. An on/off operation period of heater during a heat-preserving process for the first amount (1–2 persons amount), the second amount (3–4 persons amount), the third amount (5–6 persons amount), the fourth amount (7–8 persons amount), and the fifth amount (9–10 persons amount) are 5/5. 6/4, 7/3, 8/2, and 9/1, respectively.

TABLE 2

| RICE COOKING AMOUNT | 1 | 2 | 3 | 4 | 5 |
|---|---|---|---|---|---|
| HEATER ON/OFF, 2nd HEATING | 6/4 | 7/3 | 8/2 | 9/1 | 10/1 |
| HEATER ON/OFF, HEAT-PRESERVING | 5/5 | 6/4 | 7/3 | 8/2 | 9/1 |

Tables 3 to 7 illustrate a temperature change of an internal pot according to a time passage, and illustrate a heater operation state and a heater operation period according to the temperature change of the internal pot during a second heating process. For instance, in Table 4 for the second amount, when 10 seconds has passed after the second heating process has started, a current temperature T (75° C.) of the internal pot is less than the reference temperature (76° C.). Accordingly, the heater operation state is on and the on/off operation period of the heater 25 respect to the first amount is 7/3. When 50 seconds has passed after the second heating process has started, a current temperature (83° C.) of the internal pot is greater than the reference temperature (82° C.). Accordingly, the heater operation state is off.

Tables 8 to 12 illustrate a temperature change of an internal pot according to a time passage and a heater operation state and a heater operation period according to the temperature change of the internal pot during a heating process. For example, in Table 11 for the fourth amount, when 50 seconds has passed after the heat-preserving process has started, a current temperature T (113° C.) of the internal pot is greater than the reference temperature (114° C.) . Accordingly, the heater operation state is on and the on/off operation period of the heater for the second amount is 8/2. When 80 seconds has passed after the heat-preserving process started, a current temperature (123° C.) of the internal pot is equal to the reference temperature (123° C.). Accordingly, the heater operation state is off.

TABLE 3

| time | 10 | 20 | 30 | 40 | 50 | 60 | 70 | 80 | ... | 120 |
|---|---|---|---|---|---|---|---|---|---|---|
| $T_R$ | 75 | 77 | 78 | 80 | 81 | 83 | 85 | 87 | ... | 102 |
| T | 75 | 76 | 77 | 79 | 82 | 83 | 84 | 87 | ... | 102 |
| heater state | off | off | on | on | off | off | on | off | | |
| heater on/off | 6/4 | 0/10 | 6/4 | 6/4 | 0/10 | 0/10 | 6/4 | 0/10 | | |

TABLE 4

| time | 10 | 20 | 30 | 40 | 50 | 60 | 70 | 80 | ... | 120 |
|---|---|---|---|---|---|---|---|---|---|---|
| $T_R$ | 76 | 77 | 79 | 80 | 82 | 83 | 85 | 87 | ... | 102 |
| T | 75 | 77 | 78 | 81 | 83 | 84 | 85 | 86 | ... | 102 |
| heater state | on | off | on | off | off | off | off | on | | |
| heater on/off | 7/3 | 0/10 | 7/3 | 0/10 | 0/10 | 0/10 | 0/10 | 7/3 | | |

TABLE 5

| time | 10 | 20 | 30 | 40 | 50 | 60 | 70 | 80 | ... | 120 |
|---|---|---|---|---|---|---|---|---|---|---|
| $T_R$ | 76 | 77 | 79 | 80 | 82 | 83 | 85 | 87 | ... | 102 |
| T | 75 | 77 | 78 | 81 | 83 | 84 | 85 | 86 | ... | 102 |
| heater state | on | off | on | off | off | off | off | on | | |
| heater on/off | 8/2 | 0/10 | 8/2 | 0/10 | 0/10 | 0/10 | 0/10 | 8/2 | | |

TABLE 6

| time | 10 | 20 | 30 | 40 | 50 | 60 | 70 | 80 | ... | 120 |
|---|---|---|---|---|---|---|---|---|---|---|
| $T_R$ | 76 | 77 | 78 | 80 | 82 | 83 | 85 | 87 | ... | 102 |
| T | 76 | 77 | 78 | 81 | 82 | 84 | 85 | 87 | ... | 102 |
| heater state | off | off | off | on | off | off | on | off | | |
| heater on/off | 0/10 | 0/10 | 0/10 | 9/1 | 0/10 | 0/10 | 9/1 | 0/10 | | |

TABLE 7

| time | 10 | 20 | 30 | 40 | 50 | 60 | 70 | 80 | ... | 120 |
|---|---|---|---|---|---|---|---|---|---|---|
| $T_R$ | 76 | 77 | 79 | 80 | 82 | 83 | 85 | 87 | ... | 102 |
| T | 75 | 77 | 78 | 81 | 83 | 84 | 84 | 86 | ... | 102 |
| heater state | on | off | on | off | off | off | off | on | | |
| heater on/off | 10/0 | 0/10 | 10/0 | 0/10 | 0/10 | 0/10 | 0/10 | 10/0 | | |

TABLE 8

| time | 10 | 20 | 30 | 40 | 50 | 60 | 70 | 80 | ... | 120 |
|---|---|---|---|---|---|---|---|---|---|---|
| $T_R$ | 103 | 104 | 107 | 110 | 115 | 117 | 120 | 122 | ... | 125 |
| T | 102 | 104 | 105 | 110 | 113 | 118 | 121 | 123 | ... | 125 |
| heater state | on | off | on | off | on | off | off | off | | |
| heater on/off | 5/5 | 0/10 | 5/5 | 0/10 | 5/5 | 0/10 | 0/10 | 0/10 | | |

TABLE 9

| time | 10 | 20 | 30 | 40 | 50 | 60 | 70 | 80 | ... | 120 |
|---|---|---|---|---|---|---|---|---|---|---|
| $T_R$ | 102 | 104 | 107 | 109 | 115 | 118 | 121 | 123 | ... | 125 |
| T | 102 | 103 | 105 | 109 | 113 | 119 | 122 | 123 | ... | 125 |

TABLE 9-continued

| heater state | off | on | on | off | on | off | off | off |
|---|---|---|---|---|---|---|---|---|
| heater on/off | 0/10 | 6/4 | 6/4 | 0/10 | 6/4 | 0/10 | 0/10 | 0/10 |

TABLE 10

| time | 10 | 20 | 30 | 40 | 50 | 60 | 70 | 80 | ... | 120 |
|---|---|---|---|---|---|---|---|---|---|---|
| $T_R$ | 103 | 105 | 108 | 110 | 114 | 118 | 121 | 122 | ... | 125 |
| T | 102 | 104 | 106 | 110 | 113 | 118 | 123 | 125 | ... | 125 |
| heater state | on | on | on | off | on | off | off | off | | |
| heater on/off | 7/3 | 7/3 | 7/3 | 0/10 | 7/3 | 0/10 | 0/10 | 0/10 | | |

TABLE 11

| time | 10 | 20 | 30 | 40 | 50 | 60 | 70 | 80 | ... | 120 |
|---|---|---|---|---|---|---|---|---|---|---|
| $T_R$ | 103 | 104 | 106 | 110 | 114 | 117 | 120 | 123 | ... | 125 |
| T | 102 | 104 | 107 | 110 | 113 | 118 | 121 | 123 | ... | 125 |
| heater state | on | off | off | off | on | off | off | off | | |
| heater on/off | 8/2 | 0/10 | 8/2 | 0/10 | 8/2 | 0/10 | 0/10 | 0/10 | | |

TABLE 12

| time | 10 | 20 | 30 | 40 | 50 | 60 | 70 | 80 | ... | 120 |
|---|---|---|---|---|---|---|---|---|---|---|
| $T_R$ | 102 | 104 | 108 | 110 | 114 | 118 | 120 | 122 | ... | 125 |
| T | 103 | 105 | 107 | 110 | 113 | 118 | 121 | 123 | ... | 125 |
| heater state | off | off | on | off | on | off | off | off | | |
| heater on/off | 9/1 | 0/10 | 9/1 | 0/10 | 9/1 | 0/10 | 0/10 | 0/10 | | |

Figure 4:
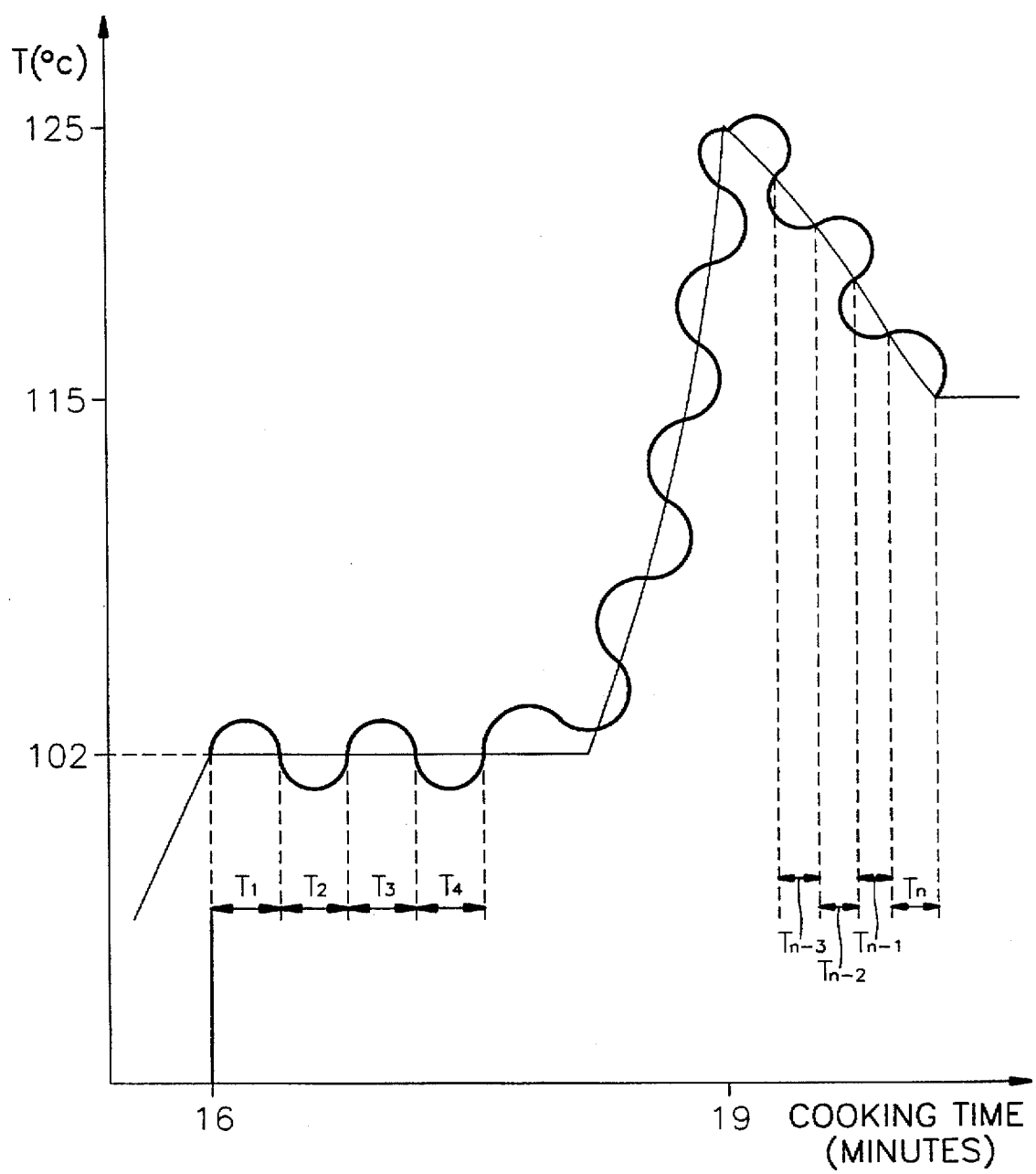
FIG. 4 is a graph for illustrating an operation state of a heater according to the temperature change of the internal pot during a second heating process and during a heat-preserving process.

FIG. 4 is illustrates an operation state of heater 25 according to the temperature change of the internal pot during a second heating process. When a current temperature T of the internal pot is equal to or greater than the reference temperature $T_R$, the heater operation state is off. When a current temperature T of the internal pot is less than the reference temperature $T_R$, the heater operation state is on. That is, the heater operation state is on at times of $T_1$, $T_3$, ... $T_{n-3}$, $T_{n-1}$, while the heater operation state is off at times of $T_2$, $T_4$, ... $T_{n-2}$, $T_n$.

An operation according to one embodiment of the present invention of the automatic temperature controlling method of a rice of an electric rice cooker will be described.

Figure 5:
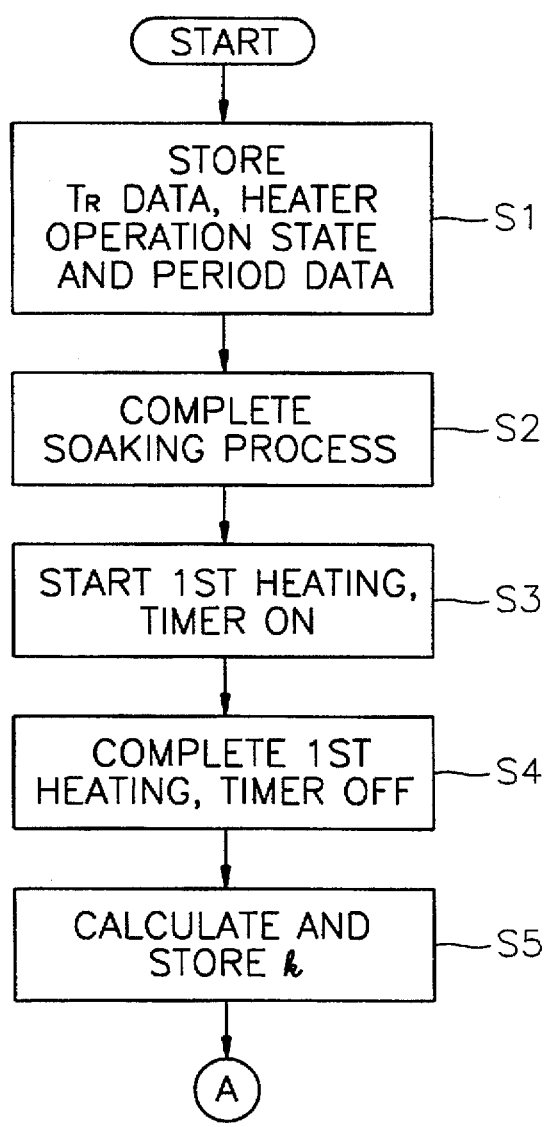
FIGS. 5 to 7 are a flow chart for illustrating an automatic temperature controlling method of a rice of an electric rice cooker according to one embodiment of the present invention.
Figure 6:
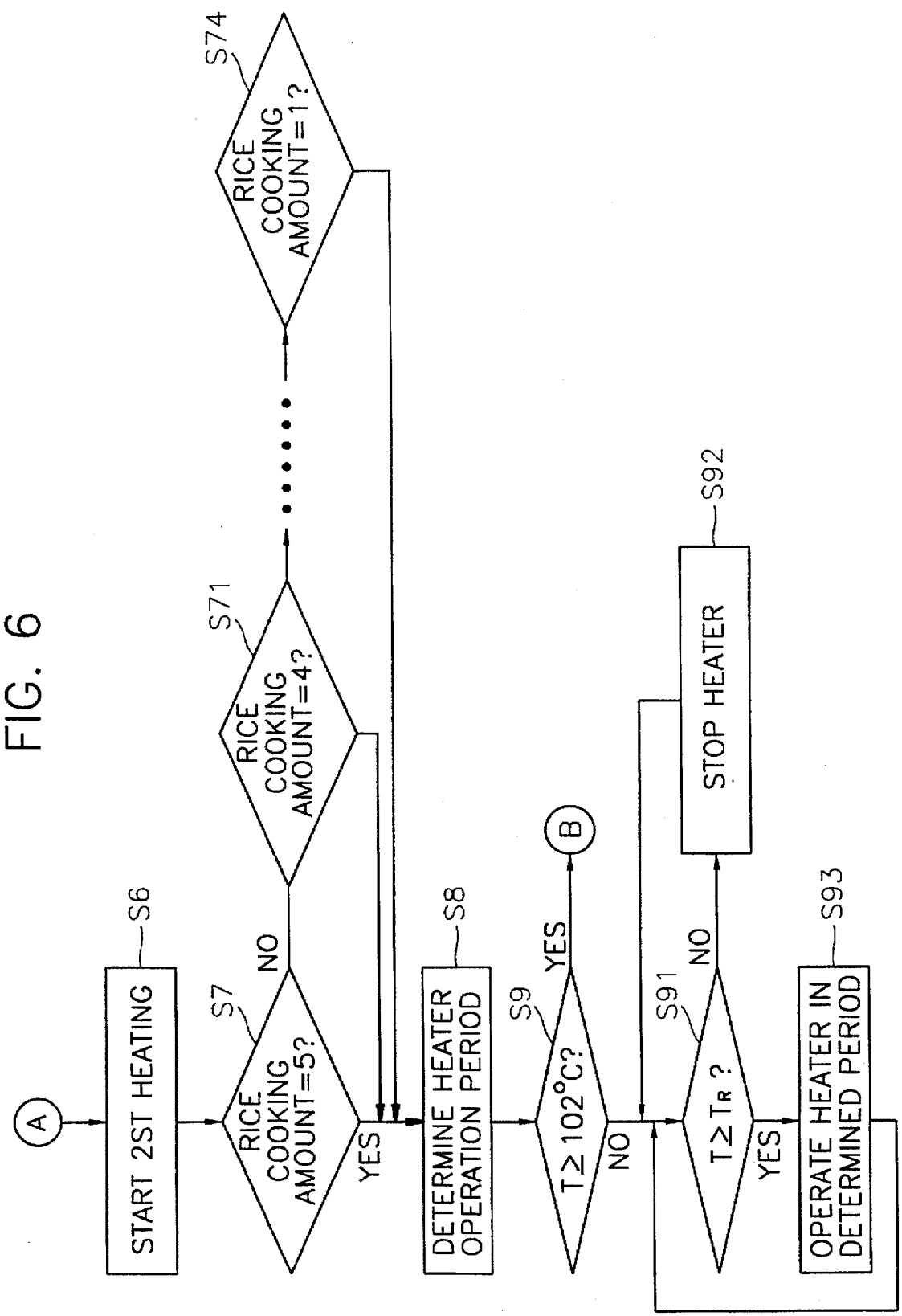
Figure 7:
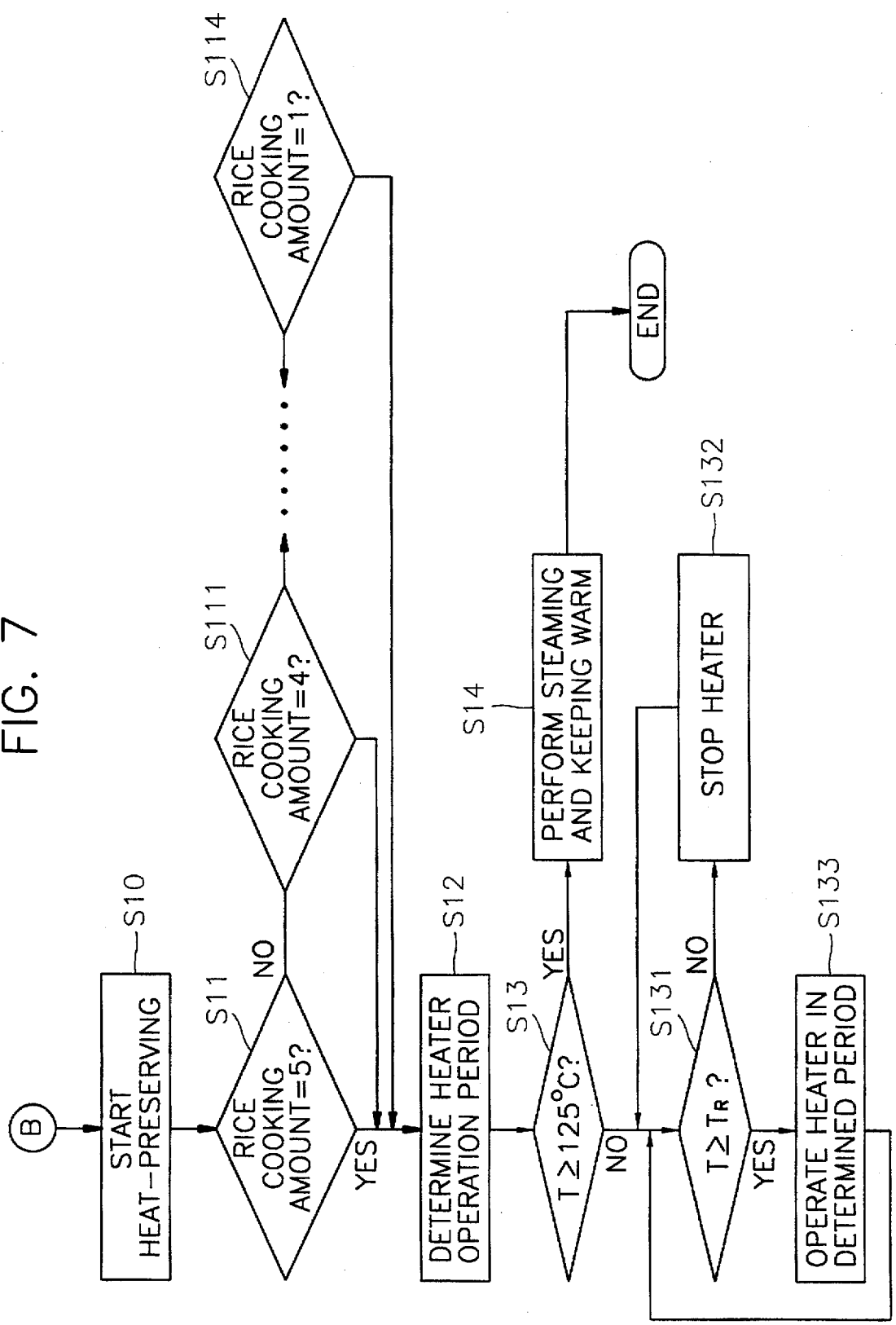

FIGS. 5 to 7 illustrates the automatic temperature controlling method of a rice of an electric rice cooker, according to one embodiment of the present invention, Before performing a rice cooking, control section 26 controls data storing section 22 to store a reference temperature data of an internal pot according to a time passage and a heater operation state and a heater operation period according to the temperature change of the internal pot during, a second heating process and during a heat-preserving process therein (step S1). After a user places an internal pot including a rice and a water therein into electric rice cooking cooker 2, control section 26 controls an operation of heater 25 to heat the rice and the water so that a soaking process is completed (step S2).

Control section 26 controls an operation of heater 25 and turns-on timer 21 so that the internal pot can be heated to the temperature for completing the first heat process (step S3). When the internal temperature T reaches the temperature for completing the first heating process, the first heating process is completed and control section 26 turns-off the timer (step S4).

Then, control section 26 calculates a required time k of a temperature interval during the first heating process, that is, the time interval from a predetermined temperature of 50° C. to the temperature 75° C. for completing the first heat process by means of the timer 21 shown in FIG. 3. Then control section 26 stores the calculated value of k in data storing section 22 (step S5). The calculated value of k is used as a judging reference for the cooking amount during a second heating process and during a heat preserving process.

Next, the second heating process starts (step S6), and control section 26 judges whether or not the rice cooking amount data stored in data storing section 22 is the fifth rice cooking amount (step S7). In step S7, when it is judged that the rice cooking amount data stored in data storing section 22 is the fifth rice cooking amount, control section 26 reads a heater operation period data corresponding to the fifth rice cooking amount from the data storing section 22 and determines the on/off operation period of heater 25 by using the read data, and then control section 26 controls an operation of heater 25 to heat the internal pot for the determined heater operation period in step S8. That is, the on/off operation period of heater corresponding to the fifth rice cooking amount is 10/10, as shown in Table 2.

On the other hand, in step S7, when it is judged that the rice cooking amount data stored in data storing section 22 is not the fifth rice cooking amount, control section 26 judges whether or not the rice cooking amount data stored in data storing section 22 is the fourth rice cooking amount (step S71). In step S71, when it is judged that the rice cooking amount data stored in data storing section 22 is the fourth rice cooking amount, control section reads a heater operation period data corresponding to the fourth rice cooking amount from the data storing section and determines the on/off operation period of heater 25 by using the read data in step S711. That is, the on/off operation period of heater 25 corresponding to the fourth rice cooking amount is 9/1, as shown in Table 2.

The on/off operation periods of heater 25 for the first rice cooking amount, the second rice cooking amount, and the third rice cooking amount can be determined in the same manner. That is, the on/off operation periods of heater 25 corresponding to the first, second, and third rice cooking amounts are 6/4, 7/3, and 8/2, as shown in Table 2.

In step S9, control section 26 judges whether or not a current temperature T of the internal pot is equal to or greater than a temperature for starting a heat-preserving process, that is, 102° C.

In step 9, when it is judged that the current temperature of the internal pot is equal to or greater than 102° C., the routine goes to a heat-preserving process. However, when it is judged that the current temperature of the internal pot is less than 102° C., control section 26 judges whether or not a current temperature of the internal pot is equal to or greater than the reference temperature in step S91.

In step S91, when it is judged that current temperature of the internal pot is equal to or greater than the reference temperature, control section 26 stops heater 25 (step S92) and the routine returns to step S91. In step S91, when it is judged that current temperature of the internal pot is less than the reference temperature, control section controls an operation of heater 25 to heat the internal pot for the determined heater operation period in step S8 until the temperature of the internal pot reaches the reference (step S93) and the routine returns to step S91.

On the other hand, in step S9, when it is judged that the current temperature of the internal pot is less than 102° C., the heat-preserving process starts (step S10), and control section 26 judges whether or not data of the rice cooking mount stored in data storing section 22 is the fifth rice cooking amount (step S11). In step 11, when it is judged that the data of the rice cooking mount stored in data storing section 22 is the fifth rice cooking amount, control section 26 reads a heater operation period data corresponding to the fifth rice cooking amount from data storing section 22 and determines the on/off operation period of heater during the heat-preserving process by using the read data in step S12. That is, the on/off operation period of heater 25 corresponding to the fifth rice cooking amount during heat-preserving process is 9/1, as described in Table 2.

On the other hand, in step S11, when it is judged that the rice cooking amount data stored in data storing section 22 is not the fifth rice cooking amount, control section 26 judges whether or not the rice cooking mount data stored in data storing section 22 is the fourth rice cooking amount (step S111). In step S111, when it is judged that the data of the rice cooking mount stored in data storing section 22 is a fourth rice cooking amount, control section 26 reads a heater operation period data corresponding to the fourth rice cooking amount from the data storing section and determines the on/off operation period of heater 25 during the heat-preserving process by using the read data in step S12. That is, the on/off operation period of heater 25 corresponding to the fourth rice cooking amount during the heat-preserving process is 8/2, as shown in Table 2.

The on/off operation period of heater 25 for the first, second, and third rice cooking amount during the heat-preserving process can be determined in the same manner. That is, the on/off operation period of heater 25 corresponding to the first, second, and third rice cooking amounts during the heat-preserving process are 5/5, 6/4, and 7/3, as shown in Table 2.

In step S13, control section judges whether or not a current temperature of the internal pot is equal to or greater than a temperature for starting a steaming process, that is, 125° C.

In step 13, when it is judged that the current temperature T of the internal pot is equal to or greater than 125° C., the routine goes to a steaming process. However, when it is judged that the current temperature T of the internal pot is less than 125° C., control section 26 judges whether or not a current temperature T of the internal pot is equal to or greater than the reference temperature in step S131.

In step S131, when it is judged that the current temperature T of the internal pot is equal to or greater than the reference temperature, control section 26 stops heater 25 (step S132) and the routine returns to step S131. In step S131, when it is judged that current temperature of the internal pot is less than the reference temperature, control section 26 controls an operation of heater 25 to heat the internal pot for the determined heater operation period in step S12 until the temperature of the internal pot reaches the reference temperature (step S133), and the routine returns to step S131.

On the other hand, in step 13, when it is judged that the current temperature of the internal pot is equal to or greater than 125° C., the steaming process and a keeping warm process are performed (step S14), and the total process is completed.

When the above process is repeatedly performed, it gets a result as shown in FIG. 4. Accordingly, a current temperature of the internal pot tracks a reference temperature so that the rice cooking process can be performed at a set temperature.

As described previously, in the present invention, a reference temperature of an internal pot is pre-set according to a time passage so that the rice can approximately be cooked at the set temperature by controlling the heater operation period. Therefore, the present invention has an advantages that it can prevent a change in the state a boiled rice due to an outside influence.

The invention may be embodied in other specific forms without departing from the spirit or essential characteristics thereof. The present embodiments are therefore to be considered in all respects as illustrative and not respective, the scope of the invention being indicated by the appended claims rather than by the foregoing description and all changes which come within the meaning and range of the claims are therefore intended to be embraced therein.

What is claimed is:

1. An automatic temperature controlling method of an electric rice cooker, said method comprising the steps of:

a) storing reference temperature data of an internal pot including rice according to a time passage, and storing heater operation state data and heater on/off operation period data according to a temperature change of the internal pot during a second heating process and a heat-preserving process;

b) heating the internal pot to a first temperature for completing a first heating process after a soaking process, calculating a time interval from a second temperature for beginning the first heating process to the first temperature for completing a first heating process, storing the calculated time interval, and storing an amount of the rice corresponding to the calculated time interval;

c) starting the second heating process and judging how many rice cooking amount is the rice amount stored in step b);

d) reading a heater operation period data corresponding to the judged rice cooking amount from the stored heater operation period data in step a), and determining a heater on/off operation period of the second heating process based on the read heater operation period data;

e) judging whether a current temperature of the internal pot is equal to or greater than a third temperature for starting a heat-preserving process, and when the current temperature of the internal pot is less than the third temperature, comparing the current temperature of the internal pot with the reference temperature data stored in step a);

f) controlling an operation of the heater according to a comparison result of step e);

g) starting the heat-preserving process and judging which rice cooking amount is the rice amount stored in step b), when the current temperature of the internal pot is equal to or greater than the third temperature in step e);

h) reading a heater operation period data corresponding to the judged rice amount from the stored heater operation period data in step a), and determining the heater operation period of the heat-preserving process based on the read heater operation period data;

i) judging whether the current temperature of the internal pot is equal to or greater than a fourth temperature for starting a steaming process, and when the current temperature of the internal pot is less than the fourth temperature, comparing the current temperature of the internal pot with the reference temperature data stored in step a); and j) controlling an operation of the heater according to a comparison result of step j).

2. The automatic temperature controlling method of an electric rice cooker as claimed in claim 1, wherein according to a comparison result of step e), the heater is stopped when the current temperature of the internal pot is less than the reference temperature data stored in step a), and the internal pot is heated with the determined heater operation period in step d) when the current temperature of the internal pot is equal to or greater than the reference temperature data stored in step a).

3. The automatic temperature controlling method of an electric rice cooker as claimed in claim 1, wherein according to a comparison result of step i), the heater is stopped when the current temperature of the internal pot is less than the reference temperature data stored in step a), and the internal pot is heated with the determined heater operation period in step h) when the current temperature of the internal pot is equal to or greater than the reference temperature data stored in step a).

4. The automatic temperature controlling method of an electric rice cooker as claimed in claim 1, wherein the heater on/off operation period varies according to the rice amount in the internal pot.

5. The automatic temperature controlling method of an electric rice cooker as claimed in claim 1, wherein the heater on/off operation periods of first, second, third, fourth, and fifth rice cooking amounts during the second heating process are six seconds/four seconds, seven seconds/three seconds, eight seconds/two seconds, nine seconds/one second, and ten seconds/zero seconds, respectively.

6. The automatic temperature controlling method of an electric rice cooker as claimed in claim 1, wherein the heater on/off operation periods of first, second, third, fourth, and fifth rice cooking amounts during the heat-preserving process are five seconds/five seconds, six seconds/four seconds, seven seconds/three seconds, eight seconds/two seconds, nine seconds/one second, respectively.

7. An automatic temperature controlling method of an electric rice cooker, said method comprising the steps of:

i) storing reference temperature data of an internal pot including rice according to a time passage, and storing heater operation state data and heater operation period data according to a temperature change of the internal pot during a second heating process and a heat-preserving process;

ii) heating the internal pot to a first temperature for completing a first heating process after a soaking process, calculating a time interval from a second temperature for beginning a first heating process to the first temperature in order to judge an amount of the rice to be cooked, storing the calculated time interval, and storing the rice amount corresponding to the calculated time interval;

iii) starting the second heating process and judging which rice cooking amount is the rice amount stored in step ii);

iv) reading a heater operation period data corresponding to the rice amount from the stored heater operation period data in step i), and determining the heater operation period of the second heating process based on the read heater operation period data;

v) judging whether a current temperature of the internal pot is equal to or greater than a third temperature for starting a heat-preserving process, and when the current temperature of the internal pot is less than the third temperature, judging whether or not the current temperature of the internal pot is equal to or greater than the reference temperature data stored in step i);

vi) stopping the heater, when the current temperature of the internal pot is less than the reference temperature data stored in step i), and heating the internal pot for the determined heater operation period in step iv), when the current temperature of the internal pot is equal to or greater than the reference temperature data stored in step i);

vii) starting a heat-preserving process and judging which rice cooking amount is the rice amount stored in step ii), when the current temperature of the internal pot is equal to or greater than the third temperature in step v);

viii) reading a heater operation period data corresponding to the rice amount from the stored heater operation period data in step i), and determining the heater operation period of the heat-preserving process based on the read heater operation period data;

ix) judging whether a current temperature of the internal pot is equal to or greater than a fourth temperature for starting a steaming process, and when the current temperature of the internal pot is less than the fourth temperature, judging whether or not the current temperature of the internal pot is equal to or greater than the reference temperature data stored in step i); and x) stopping the heater, when the current temperature of the internal pot is less than the reference temperature data stored in step i), and heating the internal pot with the determined heater operation period in step i), when the current temperature of the internal pot is equal to or greater than the reference temperature data stored in step i).

8. The automatic temperature controlling method of an electric rice cooker as claimed in claim 7, wherein the heater on/off operation period varies according to the rice cooking amount.

9. The automatic temperature controlling method of an electric rice cooker as claimed in claim 8, wherein the heater on/off operation periods of first, second, third, fourth, and fifth rice cooking amounts during the second heating process are six seconds/four seconds, seven seconds/three seconds, eight seconds/two seconds, nine seconds/one second, and ten seconds/zero second, respectively.

10. The automatic temperature controlling method of an electric rice cooker as claimed in claim 8, wherein the heater on/off operation periods of first, second, third, fourth, and fifth rice cooking amounts during the heat-preserving process are five seconds/five seconds, six seconds/four seconds, seven seconds/three seconds, eight seconds/two seconds, nine seconds/one second, respectively.

* * * * *